Aug. 24, 1948.  E. GROPPELL  2,447,906
HATCH COVER
Filed Aug. 1, 1946  2 Sheets-Sheet 1

Inventor
EUGENE GROPPELL

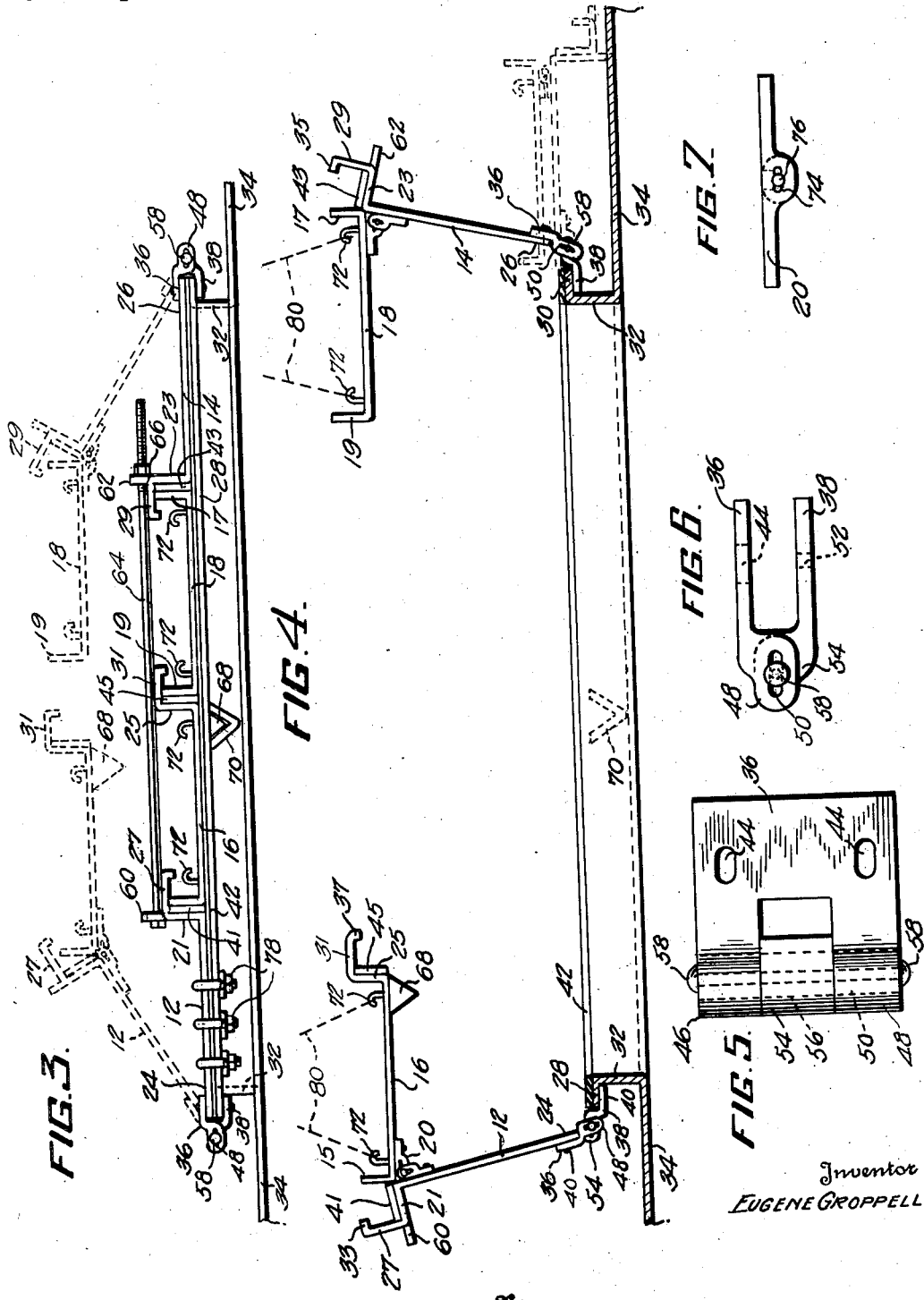

Patented Aug. 24, 1948

2,447,906

UNITED STATES PATENT OFFICE 2,447,906

HATCH COVER

Eugene Groppell, New Orleans, La.

Application August 1, 1946, Serial No. 687,732

9 Claims. (Cl. 114—201)

The present invention in its broader aspects relates generally to closure devices.

More particularly the invention is concerned with certain new and useful improvements in hatch covers for closing the hatchways of ships, especially such hatchways provided in large seagoing cargo vessels.

Cargo vessels of the type with which the present invention is concerned are customarily provided with several groups of large vertically aligned deck openings or hatchways for facilitating loading and unloading of cargo between the various decks thereof. These hatchways are made as large as possible in order that the maximum size loads may be passed therethrough and are vertically aligned so that the loading operation may be carried on by means of cargo booms operating in conjunction with winches and platforms or cargo nets to raise and lower the loads in a straight line to any desired deck level.

Although such large aligned hatchways greatly facilitate the loading and unloading of the ship, their use also presents a number of rather serious problems arising on the one hand from the sheer weight and bulk of the covers which must be provided and on the other hand from the peculiar nature of the vessel itself which in addition to transporting a load must be capable of withstanding the unusual stresses imposed upon it by storms at sea.

In the operation of large cargo vessels of the type referred to herein it is customary for the crew to start opening the various cargo hatchways as the vessel is coming into port in order that a minimum of time may be lost in commensing unloading. At this time there is relatively little danger of encountering any storm of sufficient force to damage the vessel although light squalls and thunder storms are of course relatively frequent and apt to be encountered at any time. Such relatively light rain storms may also be encountered while the vessel is in port and in either case it is highly desirable to provide some form of protection to prevent the entrance of rain although it is, of course, entirely unnecessary that such protective devices possess the great strength required to resist damage by violent storms at sea.

Accordingly, the principal object of the present invention is to provide an improved hatch cover for use with a cargo vessel of the type described which may be readily employed in a simple and expeditious manner to protect the hatchway against the entrance of rain during light storms and which is also capable of being securely battened down to resist damage by storms at sea.

Another object of the invention is to provide a collapsible hatch cover of the type described adapted to be mounted upon a conventional coaming structure by means of novel hinges in such manner that the covers may be opened from port to starboard by the use of conventional ship's booms and wherein a single tensioning device serves to clamp all joints together so that no special battening down equipment or tarpaulin is necessary to insure water-tight integrity.

A further object of the invention resides in the provision of improved closure apparatus comprising a plurality of pivotally connected panels the edge portions of which are specially constructed to form an improved water-tight seal when in closed position.

An additional object of the invention is to provide an improved hatch cover wherein the same adjustable tensioning device may be employed in a single operation to seal the various cover portions in water-tight position as well as to batten down the hatch.

The above as well as other and further objects and advantages of the invention together with a clearer understanding of the precise nature thereof will be more readily apparent to one skilled in the art from a consideration of the following detailed specification taken in conjunction with the accompanying drawings wherein:

Fig. 3 is an end elevation of the improved hatch cover showing the same in closed position in full lines and in partially opened position in dotted lines;

Fig. 4 is an end elevation similar to Fig. 3, illustrating the hatch cover in a more advanced opening stage in full lines and in a fully opened position in dotted lines;

Fig. 5 is a top plan view of a novel hinge structure forming a part of the present invention;

Fig. 6 is an end elevation of the hinge; and

Fig. 7 is an end elevation of another hinge forming a part of the improved hatch cover.

Figure 1:
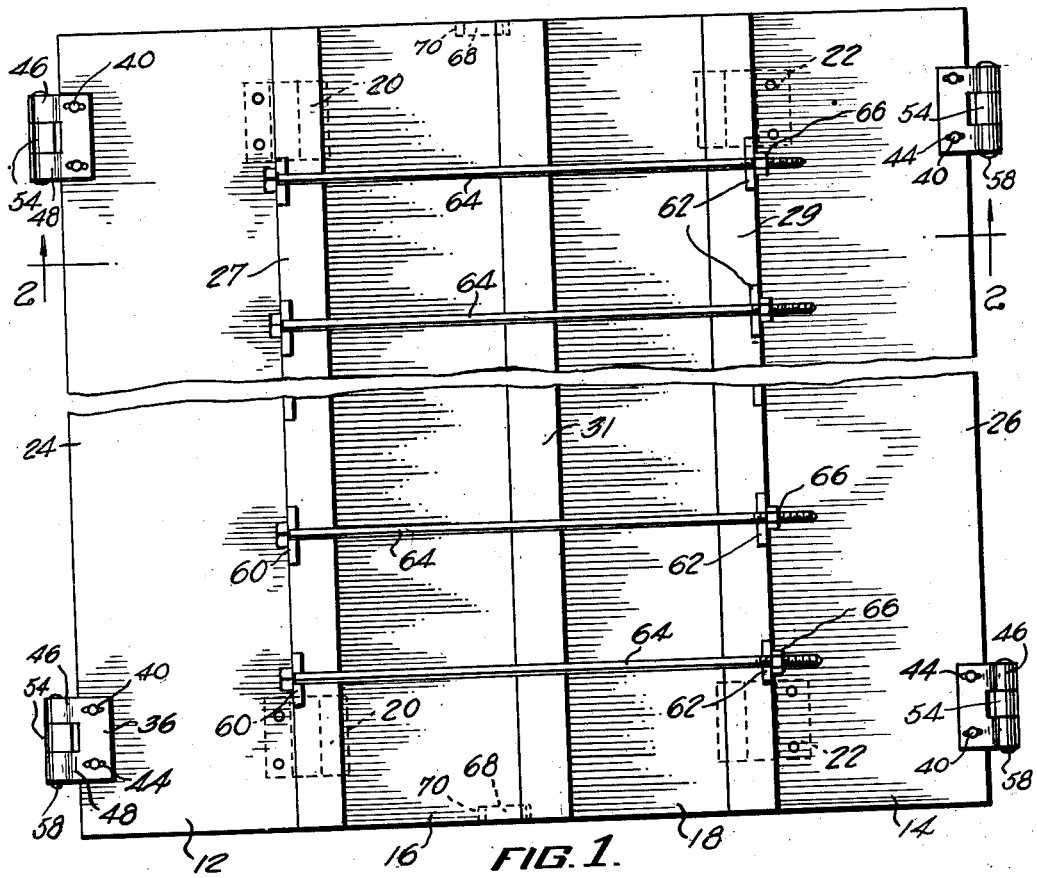
Fig. 1 is a top plan view of an improved hatch cover in accordance with the present invention showing the same in closed position.
Figure 2:
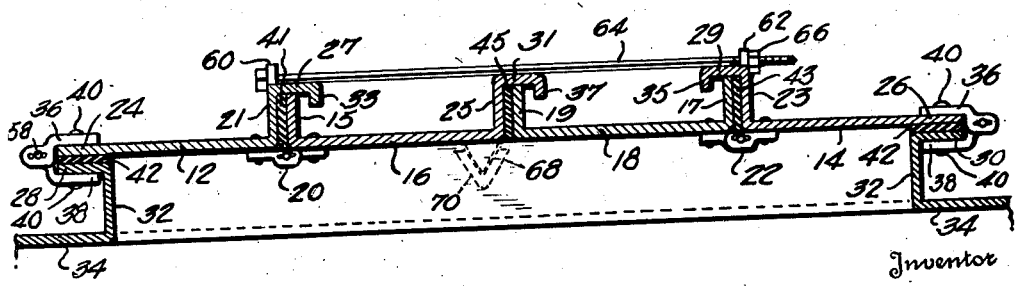
Fig. 2 is a transverse cross-sectional view through the hatch cover taken substantially along the line 2—2 of Fig. 1.

Referring to the drawings and particularly to Figs. 1 and 2 thereof, the improved hatch cover comprises a pair of collapsible closure units including outer panels 12 and 14 and inner panels 16 and 18, each unit consisting of an inner and an outer panel pivotally connected together along their adjacent edges as by means of a plurality of hinges 20 and 22. The outer panels 12 and 14 are adapted to be pivotally mounted at their outer edge portions 24 and 26 on horizontal flanges 28 and 30 formed at the top of a hatch coaming 32 which in turn extends upwardly from a ship's deck, fragments of which are indicated at 34.

The means for pivotally mounting the outer panels 12 and 14 on the flanges 28 and 30, respectively, comprises a plurality of hinges each of which includes relatively movable top and bottom portions 36 and 38, respectively (Figures 5 and 6), secured to the edge portions 24 and 26 and flanges 28 and 30 in any suitable manner as by means of bolts 40. Gaskets 42 of a suitable water-tight material such as rubber or the like are provided between the edge portions 24 and 26 and their associated flanges 28 and 30, respectively. It will be understood that similar gasket material is adapted to be employed continuously around the entire top of the coaming to form a complete seal when the hatch cover is battened down.

It will be further understood that any suitable final fastening means such as dogs or preferably swingable C-clamps (a pair of which are indicated at 78 in Fig. 3) may be provided around the entire top edge of the coaming for securing the hatch cover thereto in a well-known manner. Since these devices per se form no part of the present invention, they have been omitted from most of the drawings for the sake of clarity.

As best shown in Figs. 5 and 6, the top portion 36 of each hinge is in the form of a generally flat rectangular body having a plurality of elongated slots 44 therein adapted to receive the upper bolts 40 and a downwardly offset, bifurcated portion comprising a pair of arms 46 and 48, each of which is provided with an elongated transverse slot 50 therein. The elongated slots 44 permit an initial adjustment in the mounting of the cover, and this adjustment is intended to be of a relatively permanent nature after having once been made.

The lower portion 38 of each hinge is similarly formed as a flat body having ordinary bolt holes 52 therein adapted to receive the lower bolts 40 for securing the portion 38 to the flanges 28 and 30. The portion 38 has an offset eye 54 adapted to fit between the arms 46 and 48 of the upper portion 36 and being similarly provided with an elongated transverse slot 56 therein, similar to the slots 50. A hinge pin 58 extends through the slots 50 and 56 and it will be particularly noted that as shown in Fig. 6 the main body of this pin 58 is of circular cross section of smaller diameter than the width of the elongated slot 50. The effect is thus to provide a slight amount of vertical play between the upper and lower portions 36 and 38 at the hinge joint as well as a substantial amount of lateral play therein. This vertical play is desirable in order to accommodate the gasket 42 and as will become more fully apparent hereinafter the lateral play is provided for a similar purpose but is of relatively greater magnitude in view of the fact that it must accommodate a plurality of gaskets to be described.

Referring to Figs. 1 and 2, it will be noted that the outer edges of both of the inner panels 16 and 18 as well as the inner edge of the inner panel 18 are bent upwardly to form a plurality of substantially vertical walls or sealing flanges 15, 17 and 19. The inner edges of the outer panels 12 and 14 and the inner edge of the inner panel 16 are similarly bent upwardly to form substantially vertical walls or flange portions 21, 23 and 25, respectively, adapted to cooperate with the flanges 15, 17 and 19, and are further bent to form shields having substantially horizontal walls 27, 29 and 31 provided with downwardly projecting lip portions 33, 35 and 37, respectively.

Suitable gaskets 41, 43 and 45 of rubber or the like are adapted to be secured between the respective pairs of flanges 15 and 21; 17 and 23; and 19 and 25; respectively. The shields formed by the horizontal walls 27, 29 and 31 together with their depending lip portions 33, 35 and 37 are adapted to overlie the joints thus formed when the hatch cover is in its closed position.

A plurality of apertured lugs 60 and 62 extend upwardly from the vertical wall portions 21 and 23 of the outer panels 12 and 14. These lugs are adapted to receive a plurality of tensioning devices in the form of elongated threaded tie rods or bolts 64 having nuts 66 adjustable to vary the tension of the rods. A generally triangular or V-shaped projection 68 depends from each end of the inner panel 16 adjacent the inner edge of the latter and is adapted to engage loosely in a similarly V-shaped notch formed by an angular member 70 secured to the outside of the coaming 32 in any suitable manner as for example by welding. The projections 68 and notches 70 serve to guide the hatch cover during the closing operation.

A plurality of hooks 72 (Fig. 3) are attached to the top surface of each of the inner panels 16 and 18 in position to be engaged by the usual cables or chains 80 depending from the boom of the ship and adapted to be operated by power in a manner well-known in the art.

It will be particularly noted in Figs. 2 and 7 that the hinges 20 and 22 which serve to connect the inner and outer panels 16 and 12, and 18 and 14 respectively, are provided with elongated transverse apertures 74 somewhat similar to those provided in the arms 46, 48 and 54. However, the hinge pins 76 are of substantially the same diameter as the width of the apertures 74 since the joint is not required to accommodate any vertical displacement due to a gasket, but is only required to accommodate lateral displacements because of the gaskets 41, 43 and 45.

Figs. 3 and 4 illustrate in full and dotted lines the various successive positions which the apparatus assumes during operation. As shown in full lines in Fig. 3, the hatch cover is in fully closed position similar to that illustrated in Figs. 1 and 2 with both closure units in their fully extended position and lying flat along the top flanges of the coaming. The tie rods 64 are in position in the apertured lugs 60 and 62 and the nuts 66 have been set up to force the lugs towards each other. As a result of this clamping action of the tie rod 64, the packings 41, 43 and 45 are firmly compressed between the respective pairs of flanges 15 and 21; 17 and 23; and 19 and 25; forming a water-tight seal therebetween. The elongated apertures 74, 50 and 56 of the hinges permit the necessary movement of the panels to accommodate this clamping action and the vertical play between the hinge pins 58 and the apertures 50 and 56 is adquate to permit the panels to close over the coaming gasket 42.

It will be understood that to complete the job of battening down the hatch suitable clamping means are customarily provided around the outer periphery of the entire coaming and hatch cover in order to compress the gasket 42 therebetween to form a water-tight seal. For this purpose the usual swinging dogs or preferably hinged C-clamps may be provided and I have illustrated diagrammatically a pair of such clamps 78 in position adjacent the left-hand end of Fig. 3. The triangular projection 68 is illustrated as being seated loosely within the V-shaped notch 70, sufficient play being provided between these parts to permit the necessary longitudinal shifting of the panels as the tie rods are tightened.

In order to prepare the hatchway for loading or unloading operations the C-clamps 78 are first released and swung out of the way in the usual manner after which the nuts 66 are unscrewed to permit the tie rods 64 to be withdrawn from the apertured lugs 60 and 62. The customary cable or chain hoist, illustrated schematically and designated by reference numeral 80 in Fig. 4, may then be attached to the hooks 72 on the top surface of the inner panels 16 and 18 and the hatch cover raised by operation of the usual cargo winches or other hoisting apparatus. As shown in dotted lines in Fig. 3, the hatch cover has been lifted a relatively slight distance sufficient to show the pivoting action between the outer panels 12 and 14 and the coaming as well as that between the respective outer and inner panels 12, 16 and 14, 18. It will also be noted that the joint formed between the flanges 19 and 25 has been completely broken and the parts separated so that the respective closure units are free to swing upwardly and outwardly to fully opened position.

A further movement of the closure units towards open position is illustrated in full lines in Fig. 4 at which time the units have moved slightly outwardly and are in such position that they may now be lowered to the fully opened position illustrate in dotted lines at the right-hand side of Fig. 4. In this fully open position it will be noted that the inner panels are folded and lie upon their respective outer panels, the latter being supported upon the ship's deck by means of the shields 27 and 29.

It is to be particularly observed that the hatch cover in accordance with the present invention may be expeditiously swung into or out of closed position and need not be firmly clamped in order to provide a watertight covering for the hatchway. Thus, while in port the cover may be closed without the use of any of the tie rods 64, although one or two may be used to prevent accidental displacement of the cover if desired, the shields 27, 29 and 31 serving to prevent the entrance of rain into the hold. With the cover in this condition, it is only necessary to insert the remaining tie rods and tighten them in position to complete water-tight seals at each of the joints as well as to firmly secure the hatch cover in closed position.

I claim:

1. A hatch cover for a hatchway having a coaming therearound, comprising a pair of closure units, gasket means around the top of said coaming, said closure units being adapted to assume a normal closed position in a common plane engaging said gasket means, hinges connecting the remote edges of said units to said coaming, each hinge being constructed to provide for limited movement of said units toward and away from each other in said plane, means forming a sealing joint between the adjacent edges of said units, each of said units comprising a pair of panels having hingedly connected adjacent edges parallel to said remote edges of said units, and tie rods having mechanical connection with one panel of each pair for effecting movement of said units toward each other.

2. A hatch cover for a hatchway having a coaming therearound, comprising a pair of closure units adapted to assume normal closed positions with their inner edges adjacent each other and with said panels lying in a common plane over said coaming, the inner edges of said units having upstanding flanges arranged parallel to each other when said units are in normal closed position, a sealing gasket between said flanges, a plurality of hinges pivotally connecting the remote edges of said units to said coaming, each hinge comprising relatively movable parts connected respectively to said coaming and the adjacent unit and provided with elongated apertures, a pin arranged in the apertures of each hinge, and tensioning means for clamping said units toward each other while in said plane.

3. A hatch cover for a hatchway having a coaming therearound, comprising a pair of closure units adapted to assume normal closed positions with their inner edges adjacent each other and with said panels lying in a common plane over said coaming, the inner edges of said units having upstanding flanges arranged parallel to each other when said units are in normal closed position, a sealing gasket between said flanges, a plurality of hinges pivotally connecting the remote edges of said units to said coaming, each hinge comprising relatively movable parts connected respectively to said coaming and the adjacent unit and provided with elongated apertures, a pin arranged in the apertures of each hinge, an upstanding apertured lug carried by each unit, and a clamping rod extending through the openings in said lugs and operable for clamping said units toward each other while in said plane.

4. A hatch cover for a hatchway having a coaming therearound, comprising a pair of closure units adapted to asume normal closed positions with their inner edges adjacent each other and with said panels lying in a common plane over said coaming, the inner edges of said units having upstanding flanges arranged parallel to each other when said units are in normal closed position, a sealing gasket between said flanges, a plurality of hinges pivotally connecting the remote edges of said units to said coaming, each hinge comprising relatively movable parts connected respectively to said coaming and the adjacent unit and provided with elongated apertures, a pin arranged in the apertures of each hinge, each unit comprising a pair of panels having adjacent edges arranged parallel to said remote edges of said units, hinge means connecting said adjacent edges of each unit and providing limited movement of such edges toward and away from each other, sealing gaskets arranged between said adjacent edges, and means engaging the remote panels of said units for moving said panels toward each other into clamping engagement with said sealing gaskets.

5. A hatch cover for a hatchway having a coaming therearound, comprising a pair of closure units adapted to asume normal closed positions with their inner edges adjacent each other and with said panels lying in a common plane over said coaming, the inner edges of said units having upstanding flanges arranged parallel to each other when said units are in normal closed position, a sealing gasket between said flanges, a plurality of hinges pivotally connecting the remote edges of said units to said coaming, each hinge comprising relatively movable parts connected respectively to said coaming and the adjacent unit and provided with elongated apertures, a pin arranged in the apertures of each hinge, each unit comprising a pair of panels having adjacent edges arranged parallel to said remote edges of said units, hinge means connecting said adjacent edges of each unit and providin limited movement of such edges toward and away from each other, sealing gaskets arranged between said adjacent edges, corresponding pairs of apertured upstanding lugs carried by the remote panels of said units and projecting upwardly therefrom when said units are in said normal closed positions, and a tie rod extending through the apertures of the lugs of each pair for effecting clamping movement of said panels toward each other into clamping engagement with said sealing gaskets.

6. A hatch cover for a hatchway having a coaming therearound, comprising a pair of closure units adapted to assume normal closed positions with their inner edges adjacent each other and with said panels lying in a common plane over said coaming, the inner edges of said units having upstanding flanges arranged parallel to each other when said units are in normal closed position, a sealing gasket between said flanges, a plurality of hinges pivotally connecting the remote edges of said units to said coaming, each hinge comprising relatively movable parts connected respectively to said coaming and the adjacent unit and provided with elongated apertures, a pin arranged in the apertures of each hinge, each unit comprising a pair of panels having adjacent edges arranged parallel to said remote edges of said units, hinge means connecting said adjacent edges of each unit and providing limited movement of such edges toward and away from each other, sealing gaskets arranged between said adjacent edges, corresponding pairs of apertured upstanding lugs carried by the remote panels of said units and projecting upwardly therefrom when said units are in said normal closed positions, a tie rod extending through the apertures of the lugs of each pair for effecting clamping movement of said panels toward each other into clamping engagement with said sealing gaskets, and a flange connected to and extending perpendicular to one flange of each associated pair and overlying the other flange of such pair and the sealing gasket therebetween.

7. A hatch cover for a hatchway having a coaming therearound, comprising a pair of closure units adapted to assume normal closed positions with their inner edges adjacent each other and with said panels lying in a common plane over said coaming, the inner edges of said units having upstanding flanges arranged parallel to each other when said units are in normal closed position, a sealing gasket between said flanges, a plurality of hinges pivotally connecting the remote edges of said units to said coaming, each hinge comprising relatively movable parts connected respectively to said coaming and the adjacent unit and provided with elongated apertures, a pin arranged in the apertures of each hinge, each unit comprising a pair of panels having adjacent edges arranged parallel to said remote edges of said units, hinge means connecting said adjacent edges of each unit and providing limited movement of such edges toward and away from each other, sealing gaskets arranged between said adjacent edges, corresponding pairs of apertured upstanding lugs carried by the remote panels of said units and projecting upwardly therefrom when said units are in said normal closed positions, a tie rod extending through the apertures of the lugs of each pair for effecting clamping movement of said panels toward each other into clamping engagement with said sealing gaskets, and a flange connected to and extending perpendicular to one flange of each associated pair and overlying the other flange of such pair and the sealing gasket therebetween, said tie rods being arranged over and in engagement with said perpendicular flanges to prevent upward movement of said panels.

8. A hatch cover for a hatchway having a coaming therearound, comprising a pair of collapsible closure units adapted to assume normal closed positions in a common plane over said coaming, each unit comprising an inner and outer panel pivotally connected to each other at their adjacent edges, hinges connecting the outer edges of the outer units to said coaming, each hinge comprising hinge members respectively connected to said coaming and to the adjacent panel and provided with elongated apertures, the apertures of each hinge being provided with a connecting pin smaller in diameter than the width of said apertures, said adjacent edges of said panels being provided with vertically extending flanges forming abutment joints, one vertical flange of each such joint extending across the other flange of the joint to overlie the joint and terminating in a depending lip portion, a gasket in each abutment joint, upstanding apertured lugs carried by said outer panels adjacent the inner edges thereof, rods extending through the apertures of said lugs and having tightening means associated therewith, and a V-shaped projection depending from each end of one of said inner panels adjacent the inner edge thereof, said coaming having a notch to receive each projection to guide said units in closing.

9. A hatch cover for a hatchway having a coaming therearound, comprising a pair of collapsible closure units adapted to assume normal closed positions in a common plane over said coaming, each unit comprising an inner and outer panel pivotally connected to each other at their adjacent edges, hinges connecting the outer edges of the outer units to said coaming, each hinge comprising hinge members respectively connected to said coaming and to the adjacent panel and provided with elongated apertures, the apertures of each hinge being provided with a connecting pin smaller in diameter than the width of said apertures, said adjacent edges of said panels being provided with vertically extending flanges forming abutment joints, one vertical flange of each such joint extending across the other flange of the joint to overlie the joint and terminating in a depending lip portion, a gasket in each abutment joint, upstanding apertured lugs carried by said outer panels adjacent the inner edges thereof, rods extending through the apertures of said lugs and having tightening means associated therewith, a V-shaped projection depending from each end of one of said inner panels adjacent the inner edge thereof, said coaming having a notch to receive each projection to guide said units in closing, and hook means connected to the top of each inner panel for raising and lowering said units.

EUGENE GROPPELL.

REFERENCES CITED

The following references are of record in the file of this patent:

UNITED STATES PATENTS

| Number | Name | Date |
| --- | --- | --- |
| 905,041 | Wold | Nov. 24, 1908 |
| 1,821,595 | Von Tell | Sept. 1, 1931 |

FOREIGN PATENTS

| Number | Country | Date |
| --- | --- | --- |
| 466,019 | Great Britain | May 14, 1937 |
| 520,124 | Great Britain | Apr. 16, 1940 |